Sept. 28, 1943.   S. T. SIKES, JR   2,330,753
DIRECT READING RATE-OF-PENETRATION METER
Filed Nov. 24, 1941
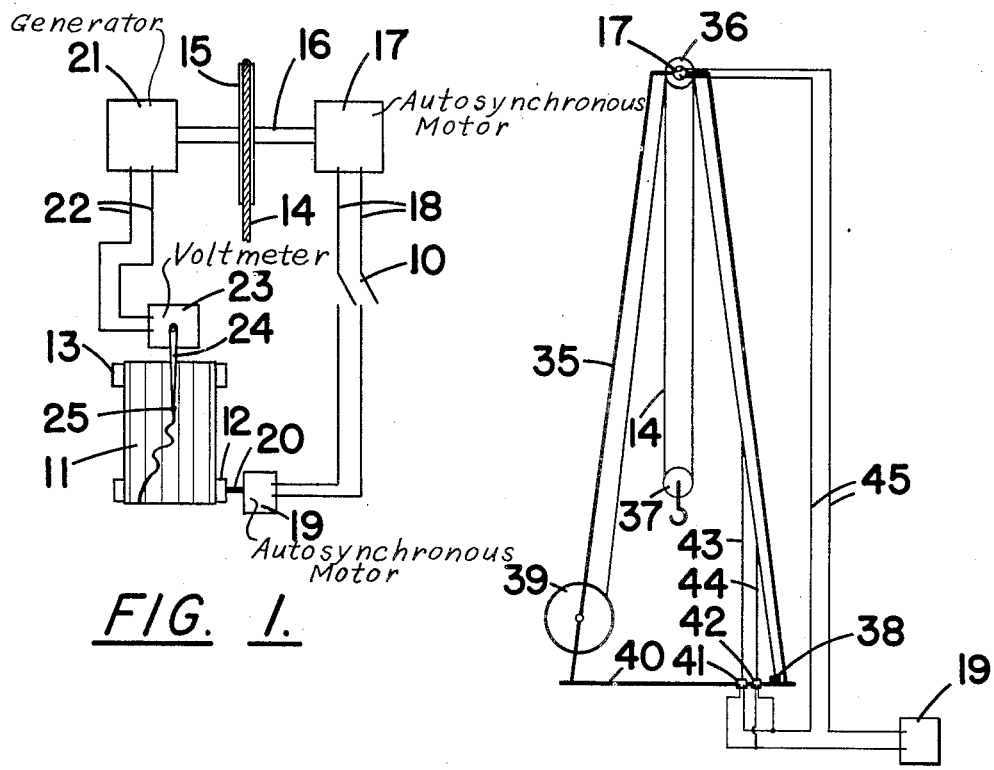
FIG. 1.
FIG. 2.
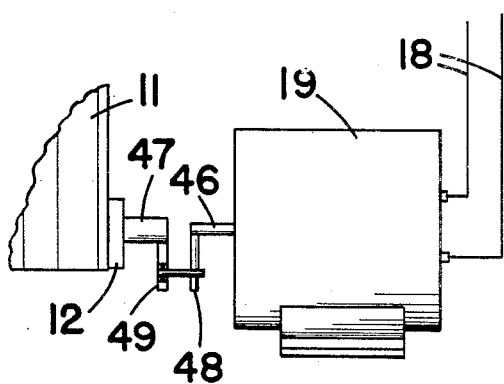
FIG. 3.
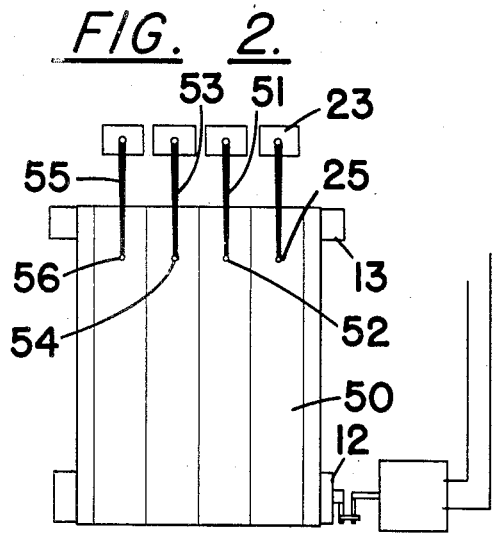
FIG. 4.
Samuel T. Sikes jr. INVENTOR.
BY J. D. McKean
ATTORNEY Patented Sept. 28, 1943

2,330,753

UNITED STATES PATENT OFFICE 2,330,753

DIRECT READING RATE-OF-PENETRATION METER

Samuel T. Sikes, Jr., Houston, Tex., assignor to Standard Oil Development Company, a corporation of Delaware Application November 24, 1941, Serial No. 420,280

10 Claims. (Cl. 234—29.5)

The present invention is directed to a device for indicating the rate of penetration of a drill bit in a rotary drilling rig.

In the drilling of bore holes, it is often desirable to produce a record of the rate of drilling. Such a record may be used for correlating the formations extending across the field, for comparison with electrical logging charts and, in addition, for studying the various factors which affect the rate of penetration.

An object of the present invention is to produce a device which will indicate and record the rate of penetration of a drill bit.

More specifically, it is an object of the present invention to produce a rate of penetration meter which records the rate of penetration on a footage basis, that is, with the abscissa indicating the drilling rate, for example, feet per hour or in minutes per foot, and the ordinate indicating the total depth of the hole, preferably in feet.

Other objects and advantages of the present invention may be seen from a reading of the following description in conjunction with the drawing in which Fig. 1 is a diagrammatic view of an embodiment of the present invention;

Fig. 2 is a view showing the application of another embodiment of the present invention to a drilling rig;

Fig. 3 is a fragmentary view showing a portion of the device of Fig. 2 in greater detail; and Fig. 4 is a fragmentary view showing a rate of penetration meter with other instruments recording values which are factors affecting the rate of penetration.

Referring specifically to the drawing, a strip chart 11 having its ends wound on drums 12 and 13 is caused to move proportionally to the movement of one of the lines 14 supporting the traveling block (not shown in this figure), by a conventional rotary drilling rig. A sheave 15 is arranged adjacent drilling line 14 so that its rotary movement will be proportional to the linear movement of line 14.

Sheave 15 is supported by shaft 16 which is secured thereto for rotation therewith, and attached to one end of shaft 16 is an autosynchronous motor 17 electrically connected through cable 18 to autosynchronous motor 19. A shaft 20 connects motor 19 with drum 12 so that the amount of movement of strip chart 11 will be proportional to the movement of cable 14.

As is known to the skilled workman in the drilling art, as each new joint is added to the drill stem and moves downwardly in the bore hole, the cable carrying the traveling block moves a distance proportional to the length of drill pipe. It will accordingly be evident that in accordance with the mechanism above described the linear movement of strip chart 11 will be in proportion to the downward movement of the drill bit. Accordingly, the strip chart may be calibrated to reflect the total depth of the bore hole.

Also attached to shaft 16 is generator 21. This generator is of the type in which the voltage produced is directly proportional to the rate of rotation of the generator as, for example, the well known tachometer generator, but it will be apparent that other generators in which this relation exists may also be employed. Electrically connected to generator 21 through electrical conductors 22 is millivoltmeter 23 provided with arm 24 carrying pen 25 arranged to produce a record on chart 11. The voltage produced by the generator is proportional to the speed of drilling line 14.

The speed of rotation of shaft 16 being proportional to the rate of movement of drilling line 14, it will be apparent that the voltage produced by generator 21 is directly proportional to the rate of penetration of the drill bit suspended by drilling line 14. In like manner, it will be seen that the movement of pen 25 is directly proportional to the speed of penetration of the drill bit in the bore hole. Because of this relationship the ordinate of the chart may be marked to record the rate of penetration in feet per hour or in minutes per foot.

In the embodiment above described the reversal of movement of the drilling line as in pulling up the Kelly joint to add another joint of pipe, spudding, or coming out of the bore hole, will cause the direction of rotation of motors 17 and 19 to be reversed, in turn, reversing the direction of drum 12. Such reversal of movement would be undesirable and it would cause an undesirable retracting of the chart.

In order to prevent such an occurrence, switch 10 is arranged in the electrical conductors connecting motors 17 and 19 and any time that it may be necessary to raise the bit from the bottom of the hole, switch 10 is manually operated to disconnect the two motors and make the chart drive inoperable, thereby preventing such a reversal of movement of the chart. With such an arrangement millivoltmeter 23 is still connected to generator 21 and produces sideways movement of the pen, but since there is no movement of the strip chart, the record produced by the movement of the pen is not objectionable.

It may be desirable to arrange a rate of penetration meter, as above described, with switches which will automatically prevent the moving of the strip chart when spudding the pipe, making a connection or making a round trip. Such an arrangement is illustrated in Fig. 2.

Referring to Fig. 2, within derrick 35 provided with crown block 36 is suspended traveling block 37 by cable 14. Dead end 38 of the drilling line is attached to the substructure of the derrick, as conventional to the art, and the other end of the cable is controlled by hoist 39. Attached to the floor 40 of the derrick are microswitches 41 and 42. The construction of microswitches is well known, being described, for example, in U. S. Patent 1,960,020, and the detailed construction of these elements is not shown in applicant's drawing as they form no part of the present invention except in combination with the other elements.

Switches 41 and 42 are mechanically connected through cables 43 and 44 to the drilling line at a point relatively close to the dead end thereof. In this modification, motors 17 and 19 are electrically connected through conductors 45 in which the microswitches 41 and 42 are arranged in parallel. The microswitches are so arranged that switch 41 opens when drilling line is supporting less than the combined weight of the traveling block, swivel hook, elevators and kelly plus the approximate weight of a single joint of drill pipe and closes when this and greater loads are carried. Microswitch 42 is arranged so that it will close when the drilling line is supporting only the weight of the traveling block, hook and elevators, and opens when this load is exceeded.

In this modification, shafts 46 and 47 connect drum 12 with motor 19. As shown in the detail drawing of Fig. 3, shaft 46 is provided with an arm 48 extending at right angles thereto, and shaft 49 is provided with an arm 49 which first extends at right angles thereto and then makes an angle of 90° so that it will cooperate with arm 48 when the shaft rotates in one direction, but will back away from 48 when the direction of rotation of the shaft is reversed. The device is so proportioned that when arm 49 is in contact with arm 48, the total vertical travel of the traveling block between the floor and the crown block of the derrick will not cause arm 49 to back up a complete revolution and come in contact with the other side of arm 48. The purpose of arms 48 and 49 is to permit reversed motion of the driving arm 48 while spudding or carrying out other drilling operations requiring raising the drill pipe without causing the strip chart to back up, but will cause the chart to move in the proper direction when the bit is again on bottom and drilling is resumed.

The purpose of the microswitch 41 is to make the unit automatic while making connections, that is, while adding single joints of drill pipe. In performing this operation, the pipe must be raised an amount equivalent to the length of the Kelly joint, and the string of drill pipe set on the slips. During this operation, the arm 48 backs away from arm 49. The Kelly joint is then disconnected from the string of drill pipe, and this causes the microswitch 41 to open the circuit between the self-synchronising elements 17 and 19, thereby allowing motor 19 to remain stationary while the Kelly is picked up, a single joint of pipe attached to the drill stem, either by a rathole connection, or by setting the kelly in the rathole and picking up the single and adding it directly to the string. When the kelly is again connected to the whole string of drill pipe, microswitch 41 is closed, causing motor 19 to become operative, whereby the lowering of the string of drill pipe an amount equal to the length of the kelly to place the bit on the bottom will rotate arm 48 forward and bring it in contact with arm 49 preparatory to again moving the recording chart. It will be apparent that in the drilling rig a portion of the kelly is above the rotary table equivalent in length to the single joint of pipe added to the string, with the device ready to record the drilling rate as the hole is made and the kelly is lowered.

By placing the second microswitch 42 in parallel with microswitch 41, a means is provided which allows arm 48 to oscillate without causing movement of the arm 49 and chart 11 while making round trips.

In coming out of the hole, as the kelly is pulled up, arm 48 is backed away from arm 49. The kelly is disconnected from the string of drill pipe, causing the microswitch 41 to open and making motor 19 inoperative. The kelly is set in the rathole and next a complete stand of pipe is pulled from the hole. The weight of the entire string is sufficient to close the microswitch 41, causing motor 19 to become operative and arm 48 to back further away from arm 49. The stand is then unscrewed from the string of pipe and set to one side, and the elevators disconnected. Disconnecting the elevators closes microswitch 42, and as the elevators are lowered to pick up the next stand of pipe, motor 19 is operative and moves until the elevators are in position for pulling the next stand which returns arm 48 to the same approximate position it was in before the first stand of pipe was raised. The above described procedure is repeated in withdrawing the remaining stands until all of the drill pipe has been removed from the bore hole.

It will be evident in going back into the hole that the procedure above described will be reversed accordingly; when all the drill pipe is again connected, the kelly in place and the drill bit at the bottom of the hole, arm 48 will be in contact with arm 49 and motors 17 and 19 elecrically connected so that the device will again begin recording the rate of penetration when drilling is resumed.

Another modification of the present invention is shown in Fig. 4. This figure is a fragmentary view of a suitable apparatus, the portion of the apparatus not shown being identical with that of the modification of Fig. 2. In Fig. 4, drums 12 and 13 carry strip chart 50 which is preferably marked off for receiving several records. Voltmeter 23 is arranged with its marking pen 25 so that it will produce a record on one section of the strip chart, while other recording devices are arranged to produce records simultaneously on other sections of the chart. For example, arm 51 carrying pen 52 may be connected to a device which will indicate the weight supported by the drilling line, arm 53 carrying pen 54 may indicate the pressure of the mud pump, and arm 55 carrying marking pen 56 may indicate the speed of the rotary table in R. P. M. In other words, in addition to recording the rate of penetration of the drill bit, factors affecting the rate of penetration are recorded simultaneously therewith on the same chart with common ordinates for all of the data recorded.

Devices for indicating the weight supported by the drilling line, the pressure of the mud pump and the speed of the rotary table are all known to the drilling art. These specific measurements are given by way of example only, as there are other factors which affect the rate of penetration of a drill bit which may be simultaneously recorded with the rate of penetration. The feature to be emphasized in the modification of Fig. 4 is the recording of the rate of penetration on a footage basis and simultaneously recording other significant values which are factors affecting the rate of penetration on a same chart and using the same ordinate. It will be evident that the recording of the rate of penetration as well as significant factors affecting this rate with common ordinates will greatly facilitate the ease with which studies of the factors affecting rate of penetration may be made.

While Fig. 4 shows a single chart arranged for receiving several records, it will be apparent that changes may be made, such as the use of a strip chart for each record with the ordinates in the several charts of the same dimension.

While I have disclosed specific embodiments of the present invention, it will be obvious to a skilled workman in the art that various changes in the size, shape, proportion of the various parts may be made without departing from the scope of the invention and it is my intention to embrace such changes in the hereto appended claims.

I claim:

1. A device for recording the rate of penetration of a drill bit in a rotary drilling rig comprising, in combination, a chart, means for moving said chart simultaneously with the vertical movement of the drill bit in amounts proportional to said movement, an electrical generator having an output proportional to the speed of rotation, means arranged for rotating said generator at a speed proportional to the vertical speed of said drilling bit, a marking device arranged to produce a record on said chart electrically connected to said generator whereby the rate of penetration is indicated by said record.

2. A rate of penetration meter comprising, in combination, a sheave arranged to be rotated by the movement of a drilling line, a pair of electrically connected self-synchronizing elements with one of said elements mechanically linked to said sheave to rotate at a speed proportional to the speed of said drilling line, a means arranged for moving a chart mechanically linked to said other element whereby a movement of the drilling line produces a movement of the chart, a generator producing a voltage proportional to its speed of rotation mechanically linked to said sheave, and a voltmeter having a recording element electrically connected to said generator arranged to produce a record on said chart.

3. A device for recording the rate of penetration of a drill bit in a rotary drilling rig comprising, in combination, a strip chart, a potential indicating device arranged to produce a record on said chart, a generator having an output directly proportional to its speed of rotation electrically connected to said potential indicating device, means for rotating said generator at a speed proportional to the rate of downward movement of the drill bit, a pair of electrically connected self-synchronizing elements with one of said elements arranged to advance said chart, and means arranged to rotate the other of said elements in an amount proportional to the downward movement of the drill bit while drilling.

4. A rate of penetration meter adapted to indicate the rate of penetration of the drill of a rotary drilling rig comprising, in combination, a pair of electrically connected self-synchronizing elements, a chart arranged to be advanced by one of said elements, a voltmeter having a recording element arranged to produce a record on said chart, a sheave arranged for rotation by the movement of the drilling line of said rotary drilling rig, a generator having its output proportional to its speed of rotation mechanically linked to said sheave, an electrical connection between said generator and said voltmeter, a mechanical linkage between the other of said pair of self-synchronizing elements and said sheave.

5. A device in accordance with claim 4 in which the mechanical linkage between said self-synchronizing unit and said chart advancing means includes a pair of arms arranged to allow said self-synchronizing unit to reverse approximately 360° without movement of said chart.

6. A device in accordance with claim 4 in which the electrical connection between the pair of self-synchronizing elements includes a switch arranged to be operated by the tension in the drilling line.

7. A device in accordance with claim 4 in which the electrical connection between the self-synchronizing elements includes a plurality of switches, each arranged to be operated by a different tension in said drilling line.

8. A rate of penetration recorder for drilling rigs comprising a pair of electrically connected self-synchronizing elements, a chart arranged for movement by one of said self synchronizing elements, means arranged for rotating the other of said synchronizing elements in amounts proportional to the distance moved by one of the drilling lines of the rotary drilling rig, a plurality of switches in the electrical connection between the pair of self-synchronizing elements arranged to be operated by different tensions on said drilling line, and means arranged to allow said first self-synchronizing unit to oscillate without disturbing the chart when the drill bit is not advancing in the earth.

9. A device for recording the speed of an object having straight line motion comprising, in combination, a chart, a potential indicating device having a recording element arranged to produce a record on said chart, a generator having an output directly proportional to its speed of rotation electrically connected to said potential indicating device, means for rotating said generator at a speed proportional to the straight line motion of the object, a pair of electrically connected self-synchronizing elements with one of said elements arranged to advance said chart, and means arranged to rotate the other of said elements in an amount proportional to the amount of straight line movement of the object.

10. A device for recording the rate of straight line motion of a work handling line comprising, in combination, a pair of electrically connected self-synchronizing elements, a chart arranged for movement by one of said self-synchronizing elements, means arranged for rotating the other of said synchronizing elements in amounts proportional to the distance moved by the work handling line, and a plurality of switches in the electrical connection between the pair of self-synchronizing elements arranged to be operated by different tensions on said work handling line.

SAMUEL T. SIKES, Jr.